United States Patent
Salmi et al.

(10) Patent No.: US 7,788,508 B1
(45) Date of Patent: Aug. 31, 2010

(54) SYSTEM AND METHOD FOR RAPIDLY INCREASING A RISING SLEW RATE OF AN ADJUSTABLE SUPPLY VOLTAGE IN ADAPTIVE VOLTAGE SCALING

(75) Inventors: Pasi Salmi, Kemi (FI); Juha Pennanen, Oulu (FI)

(73) Assignee: National Semiconductor Corporation, Santa Clara, CA (US)

( * ) Notice: Subject to any disclaimer, the term of this patent is extended or adjusted under 35 U.S.C. 154(b) by 1428 days.

(21) Appl. No.: 11/138,037

(22) Filed: May 26, 2005

(51) Int. Cl.
*G06F 1/32* (2006.01)
(52) U.S. Cl. ................................. 713/300; 713/322
(58) Field of Classification Search ............ 713/300, 713/310, 320, 322, 340; 323/223, 224
See application file for complete search history.

(56) References Cited

U.S. PATENT DOCUMENTS

| | | |
|---|---|---|
| 6,356,615 B1 | 3/2002 | Coon et al. |
| 6,415,388 B1 | 7/2002 | Browning et al. |
| 6,548,991 B1 | 4/2003 | Maksimovic et al. |
| 6,700,422 B2 * | 3/2004 | Tang et al. ............ 327/170 |
| 6,768,363 B2 * | 7/2004 | Yoo et al. ............. 327/170 |
| 6,882,172 B1 | 4/2005 | Suzuki et al. |
| 7,080,268 B2 | 7/2006 | Mosley |
| 7,100,061 B2 | 8/2006 | Halepete et al. |
| 7,112,978 B1 | 9/2006 | Koniaris et al. |
| 7,180,322 B1 | 2/2007 | Koniaris et al. |
| 7,228,242 B2 | 6/2007 | Read et al. |
| 2002/0114244 A1* | 8/2002 | Kelly et al. ............ 369/53.37 |

OTHER PUBLICATIONS

Yee William Li et al., "Asynchronous Datapath with Software-Controlled On-Chip Adaptive Voltage Scaling for Multirate Signal Processing Applications", Proceedings of the Ninth International Symposium on Asynchronous Circuits and Systems (ASYNC'03), 2003 IEEE.
Woonseok Kim et al., "Preemption-Aware Dynamic Voltage Scaling in Hard Real-Time Systems", Proceedings of the 2004 International Symposium on Low Power Electronics and Design (ISLPED'04). pp. 393-398.
Sandeep Dhar et al., "Switching Regulator with Dynamically Adjustable Supply Voltage for Low Power VLSI", IECON'01: The 27th Annual Conference of the IEEE Industrial Electronics Society, pp. 1874-1879.

* cited by examiner

*Primary Examiner*—Thomas Lee
*Assistant Examiner*—Paul B Yanchus, III (57) ABSTRACT

A system and method is disclosed for rapidly increasing a rising slew rate of an adjustable power supply signal in an adaptive voltage scaling system. When a central processing unit of an adaptive voltage scaling system requests an increase in a performance level, a closed loop control mode of the adaptive voltage scaling system is disabled. Then a value of voltage that corresponds to the requested increased performance level is provided as a voltage change command to an adaptive voltage scaling regulator. The adaptive voltage scaling system is then operated at a maximum slew rate that can be achieved by the adaptive voltage scaling regulator. The closed loop mode is enabled after the adjustable power supply voltage reaches the requested voltage value.

23 Claims, 4 Drawing Sheets

SYSTEM AND METHOD FOR RAPIDLY INCREASING A RISING SLEW RATE OF AN ADJUSTABLE SUPPLY VOLTAGE IN ADAPTIVE VOLTAGE SCALING

TECHNICAL FIELD OF THE INVENTION

The present invention relates generally to low power integrated circuits and, more particularly, to low power integrated circuits that employ multiple operating clock frequencies and adaptive voltage scaling.

BACKGROUND OF THE INVENTION

Modern digital integrated circuits such as central processing units (CPUs) are typically capable of operating with several different clock frequencies. Assume that a CPU can reduce its clock frequency while still meeting the processing requirements of an application that is running on the CPU. As is well known, a reduction in the clock frequency of the CPU proportionally reduces the CPU power consumption. With a lower clock frequency less power is consumed because there are fewer signal level changes within a given time period.

As is also well known, the power consumption of a digital circuit is quadratrically proportional to the operating voltage. Therefore, decreasing the voltage level of the operating voltage (i.e., the supply voltage) and reducing the clock frequency can provide significant power savings in a digital circuit.

Dynamic Voltage Scaling (DVS) is a power management technique in which pre-determined voltage values (within a voltage table) are used for each requested operating clock frequency of a CPU. The voltage levels that are defined in the voltage table must be carefully selected in order to adequately cover all process and temperature corners so that the CPU will function correctly at each clock frequency.

Adaptive Voltage Scaling (AVS) is a power management technique in which the supply voltage of a digital integrated circuit is adjusted automatically. The supply voltage is adjusted (using closed loop feedback) to a minimum level that is required for the proper operation of the integrated circuit at a given clock frequency.

The major difference between Dynamic Voltage Scaling (DVS) and Adaptive Voltage Scaling (AVS) is that the Adaptive Voltage Scaling (AVS) includes automatic variation of the process and temperature in order to balance the supply voltage and system delay (digital cell delay) that is due to closed loop feedback. This means that the supply voltage in the AVS system is automatically reduced at lower temperatures and for faster silicon. As the supply voltage is reduced, the power consumption is also reduced.

Figure 1:
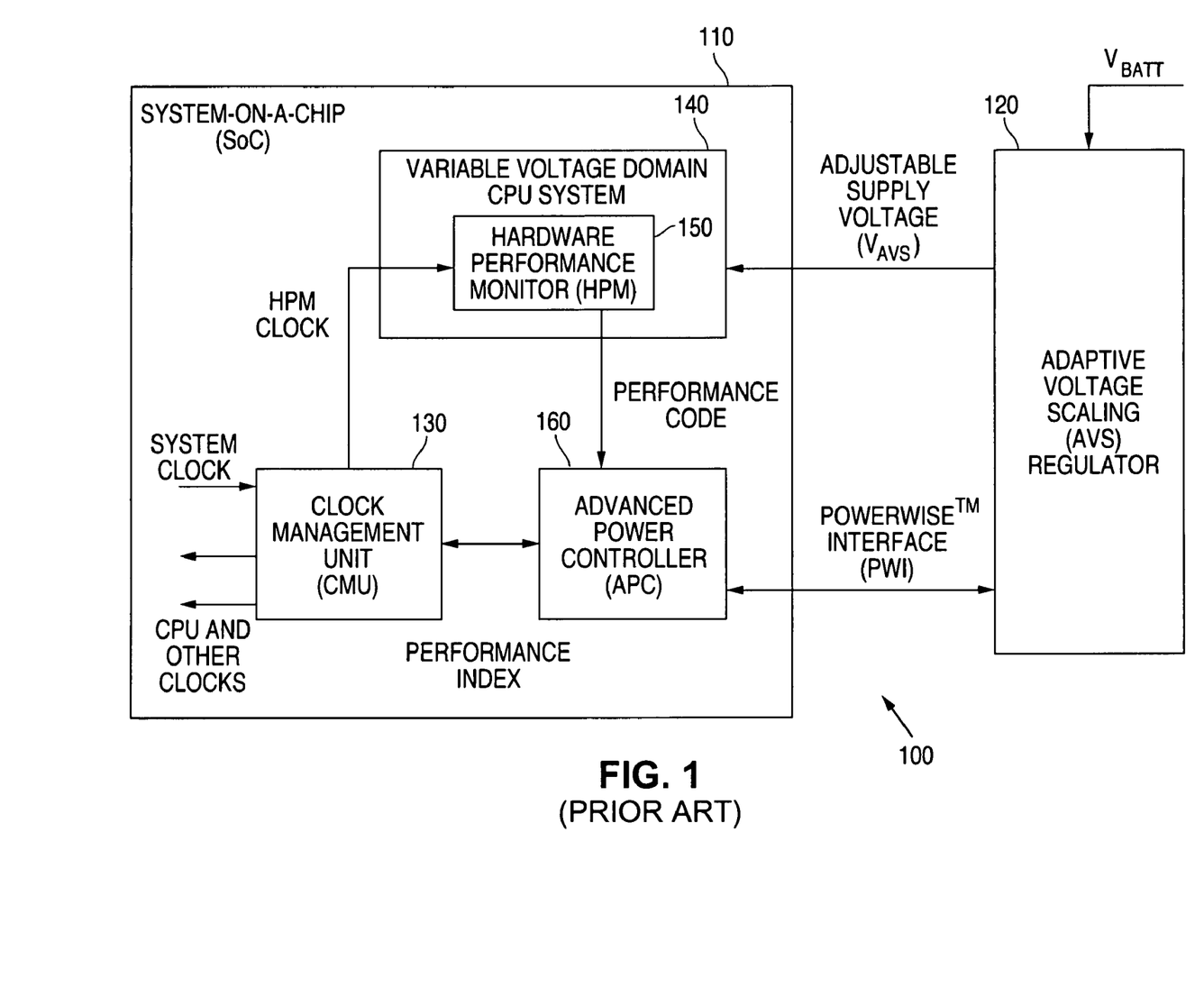
FIG. 1 is a block diagram illustrating an exemplary prior art adaptive voltage scaling (AVS) system.

FIG. 1 illustrates a block diagram of an embodiment of an exemplary prior art Adaptive Voltage Scaling (AVS) System 100. AVS System 100 comprises a System-on-a-Chip (SoC) unit 110 and an Adaptive Voltage Scaling (AVS) Regulator 120. System-on-a-Chip (SoC) unit 110 comprises a Clock Management Unit (CMU) 130, a Variable Voltage Domain CPU System 140, a Hardware Performance Monitor (HPM) 150, and an Advanced Power Controller (APC) 160. The Hardware Performance Monitor (HPM) 150 is located within the Variable Voltage Domain CPU System 140.

The Clock Management Unit (CMU) 130 receives a system clock signal from a system clock unit (not shown). The Clock Management Unit (CMU) 130 provides clock frequencies for the central processing unit (CPU) (not separately shown) in the Variable Voltage Domain CPU System 140. The Clock Management Unit (CMU) 130 also provides clock frequencies for the Hardware Performance Monitor (HPM) 150. The clock frequencies that are provided to the Hardware Performance Monitor (HPM) 150 are represented by the designation "HPM CLOCK".

The Hardware Performance Monitor (HPM) 150 tracks gate delays in the current operational conditions. The Hardware Performance Monitor (HPM) 150 is in the Variable Voltage Domain CPU System 140. The Hardware Performance Monitor (HPM) outputs a performance code to the Advanced Power Controller (APC) 160. The performance code indicates the propagation delay of digital gate cells. The Advanced Power Controller (APC) 160 processes the delay data and requests appropriate changes to the supply voltage.

The Advanced Power Controller (APC) 160 is coupled to and communicates with the Adaptive Voltage Scaling (AVS) regulator 120. In one embodiment the coupling between the Advanced Power Controller (APC) 160 and the Adaptive Voltage Scaling (AVS) regulator 120 is a PowerWise™ interface (PWI). The mark PowerWise™ is a trademark of the National Semiconductor Corporation. The Advanced Power Controller (APC) 160 sends a request to the Adaptive Voltage Scaling (AVS) regulator 120 to change the supply voltage. The Adaptive Voltage (AVS) regulator 120 provides the requested supply voltage level to the SoC 110. The adjustable supply voltage from the Adaptive Voltage Scaling (AVS) regulator 120 is designated $V_{AVS}$ in FIG. 1.

The operating system of a modern central processing unit (CPU) may support a real time scheduling of performance levels. Each performance level has associated with it a specific value of operating clock frequency. The operating system is capable of selecting an operating clock frequency for which the CPU performance is minimized on a real time basis and for which the deadlines of a particular application are still met. For example, while an MPEG4 movie encoding application is running, a performance scheduling algorithm of the operating system may predict and change the performance level of the CPU in ten millisecond (10 ms) intervals.

The Hardware Performance Monitor (HPM) 150 tracks gate delays in the current operational conditions. The Hardware Performance Monitor (HPM) 150 outputs a performance code to the Advanced Power Controller 160. The performance code indicates the propagation delay of digital gate cells. In particular, Hardware Performance Monitor (HPM) 150 sends the performance code to the Advanced Power Controller 160. The Advanced Power Controller 160 then subtracts the performance code from a standard Reference Calibration Code (RCC) to obtain an error signal.

The error signal is referred to as "Slack Time". The Slack Time error signal comprises a digital error signal in a two's complement number format. If the Slack Time is positive an increase in voltage is required. If the Slack Time is negative a decrease in voltage is required. The Slack Time error signal is provided to a Compensation Unit (not shown) within the Advanced Power Controller 160. Based on the value of the Slack Time error signal, the Compensation Unit sends a signal to AVS Regulator 120 to cause AVS Regulator 120 to adjust the value of the adjustable output voltage ($V_{AVS}$) of AVS Regulator 120.

The central processing unit (CPU) of an adaptive voltage scaling system may change its performance levels over relatively short intervals of time, possibly in millisecond intervals of time. Therefore, a relatively fast rising supply voltage transient may be required for some applications.

The closed loop control system of an adaptive voltage scaling system requires the use of a loop filter. The loop filter sets the bandwidth and the transient response speed of the closed loop. The loop filter also tends to reduce the difference between the output of the Hardware Performance Monitor (HPM) 150 and a desired Reference Calibration Code (RCC) value.

The loop filter of an adaptive voltage scaling system is typically implemented using an integrator circuit. The use of an integrator circuit is always required if steady-state error must be completely cancelled from the output of the system. However, using an integrator circuit for the loop filter has a significant drawback. The integrator circuit will always slow down the original transient response of the adaptive voltage scaling regulator in a closed loop mode. This means that the slew rate of the adjustable supply voltage signal is limited.

Whenever the central processing unit (CPU) requests a higher operating frequency, the supply voltage must be increased by the closed loop before the higher clock frequency can be enabled for the CPU. If the slew rate of the supply voltage signal is limited, the speed with which a new, higher operating frequency can be enabled is limited as well.

Therefore, there is a need in the art for a system and method for rapidly increasing a rising slew rate of an adjustable power supply signal in an adaptive voltage scaling system.

SUMMARY OF THE INVENTION

To address the above-discussed deficiencies of the prior art, it is a primary object of the present invention to provide a system and method for rapidly increasing a rising slew rate of an adjustable power supply signal in an adaptive voltage scaling system.

An advantageous embodiment of an apparatus of the present invention comprises closed loop feedback circuitry that comprises an integrator subsystem. The integrator subsystem comprises an integrator unit and a voltage select unit. When a central processing unit of the adaptive voltage scaling system requests an increase in a performance level, the adaptive voltage scaling system disables a closed loop control mode of the adaptive voltage scaling system. A value of voltage that corresponds to the requested increased performance level is selected from a voltage table memory unit within the voltage select unit of the integrator subsystem.

The selected value of voltage is provided as a voltage change command to an adaptive voltage scaling regulator. The adaptive voltage scaling regulator increases the slew rate of the adjustable supply voltage at the maximum rate that the adaptive voltage scaling regulator is capable of achieving. After the adjustable supply voltage reaches the higher value of voltage that corresponds to the requested increased performance level, the closed loop control mode of the adaptive voltage scaling system is enabled. A voltage monitor is used to evaluate the suitability of the adjustable supply voltage for a requested new operating clock frequency for the requested increased performance level.

The adjustable supply voltage is regulated in a feedback control loop until an optimum level of voltage is obtained for the requested new operating clock frequency. Then the requested new operating clock frequency is enabled to the central processing unit.

It is an object of the present invention to provide a system and method for rapidly increasing a rising slew rate of an adjustable power supply signal in an adaptive voltage scaling system.

It is another object of the invention to provide a system and method for rapidly increasing a rising slew rate of an adjustable power supply signal in an adaptive voltage scaling system that comprises an integrator subsystem that comprises an integrator unit and a voltage select unit.

It is yet another object of the present invention to provide a system and method for rapidly increasing a rising slew rate of an adjustable power supply signal in an adaptive voltage scaling system that comprises a voltage table memory unit within the voltage select unit that contains a plurality of voltage values in which each voltage value is associated with a performance level of the adaptive voltage scaling system.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future, uses of such defined words and phrases.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

Figure 2:
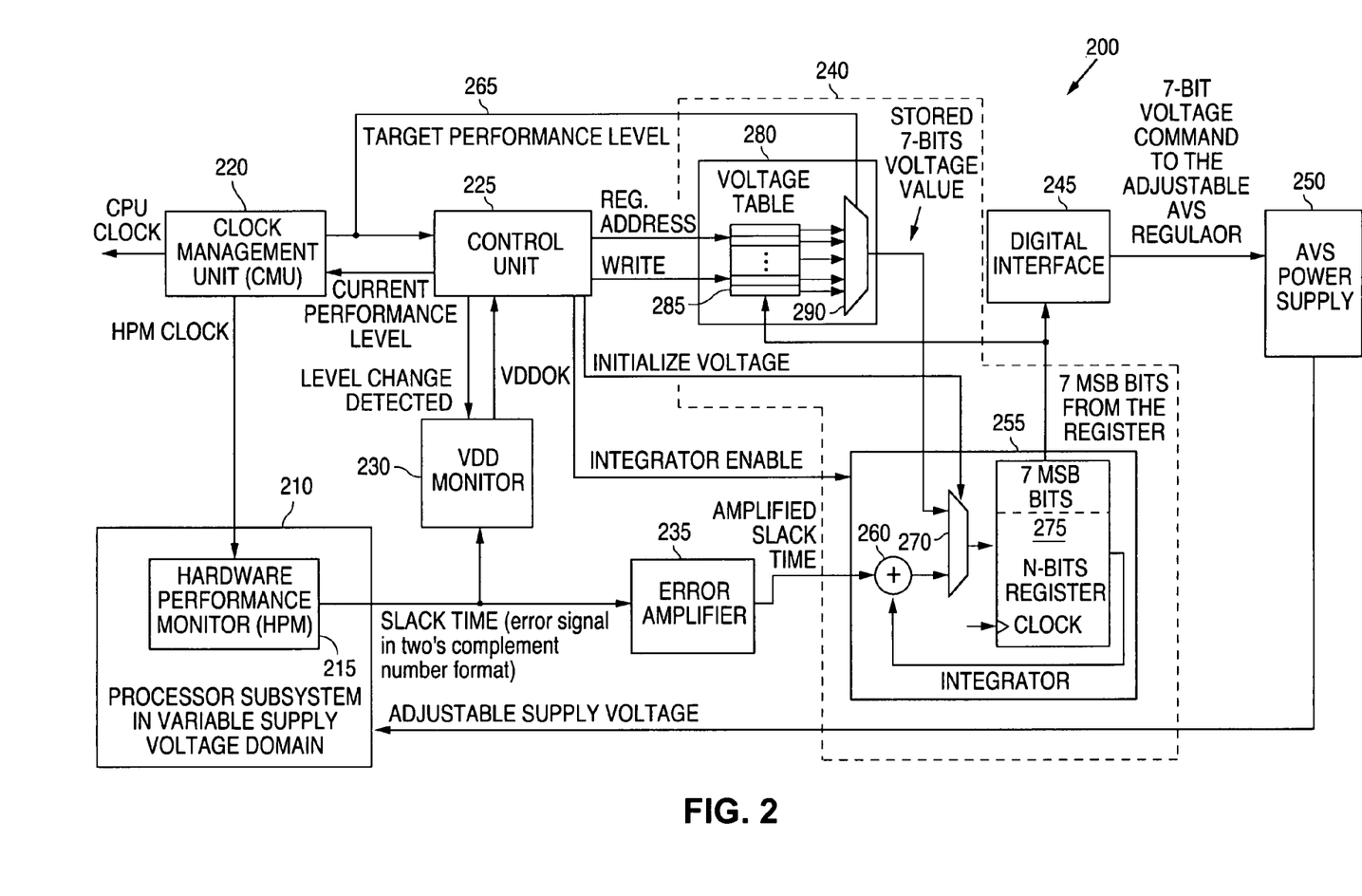
FIG. 2 is a block diagram illustrating an advantageous embodiment of an adaptive voltage scaling (AVS) system of the present invention.
Figure 3:
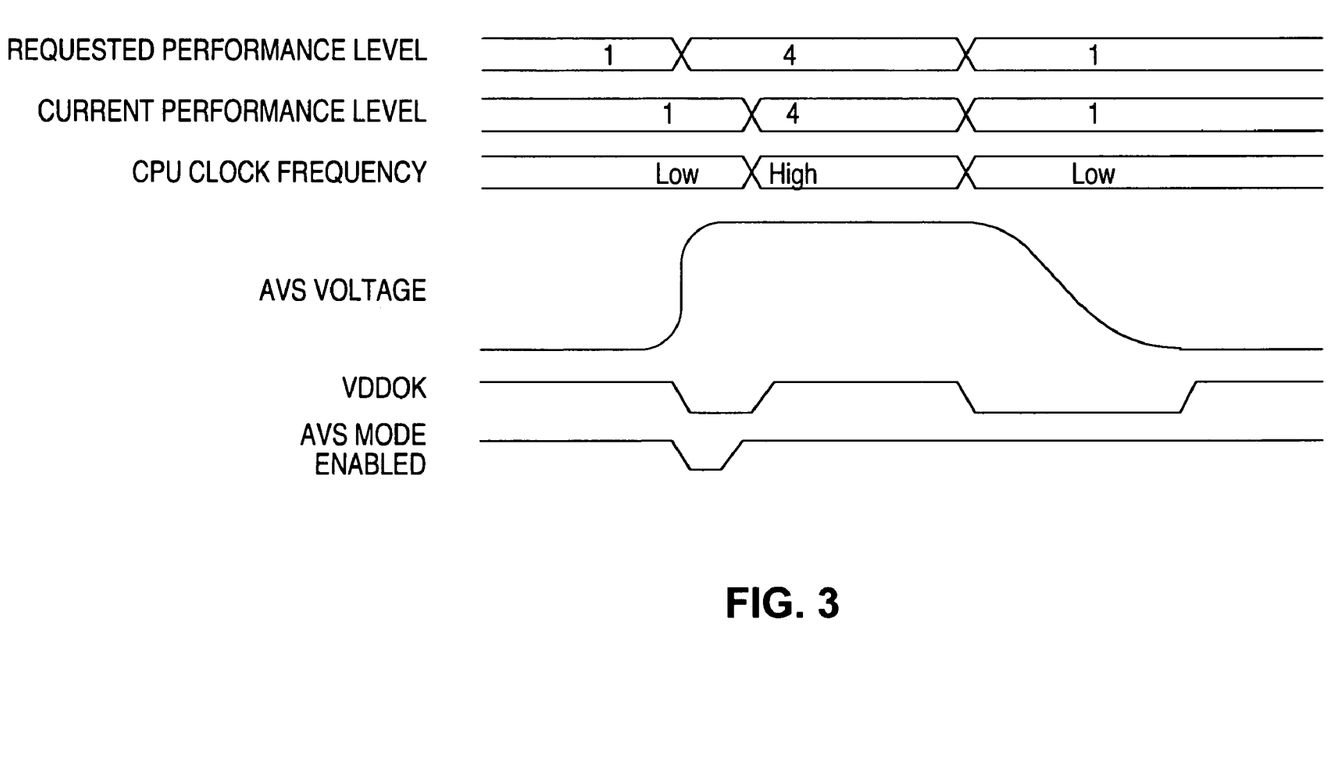
FIG. 3 is a timing diagram illustrating how a process of adaptive voltage scaling (AVS) in accordance with the principles of the present invention rapidly increases a rising slew rate of an AVS voltage.
Figure 4:
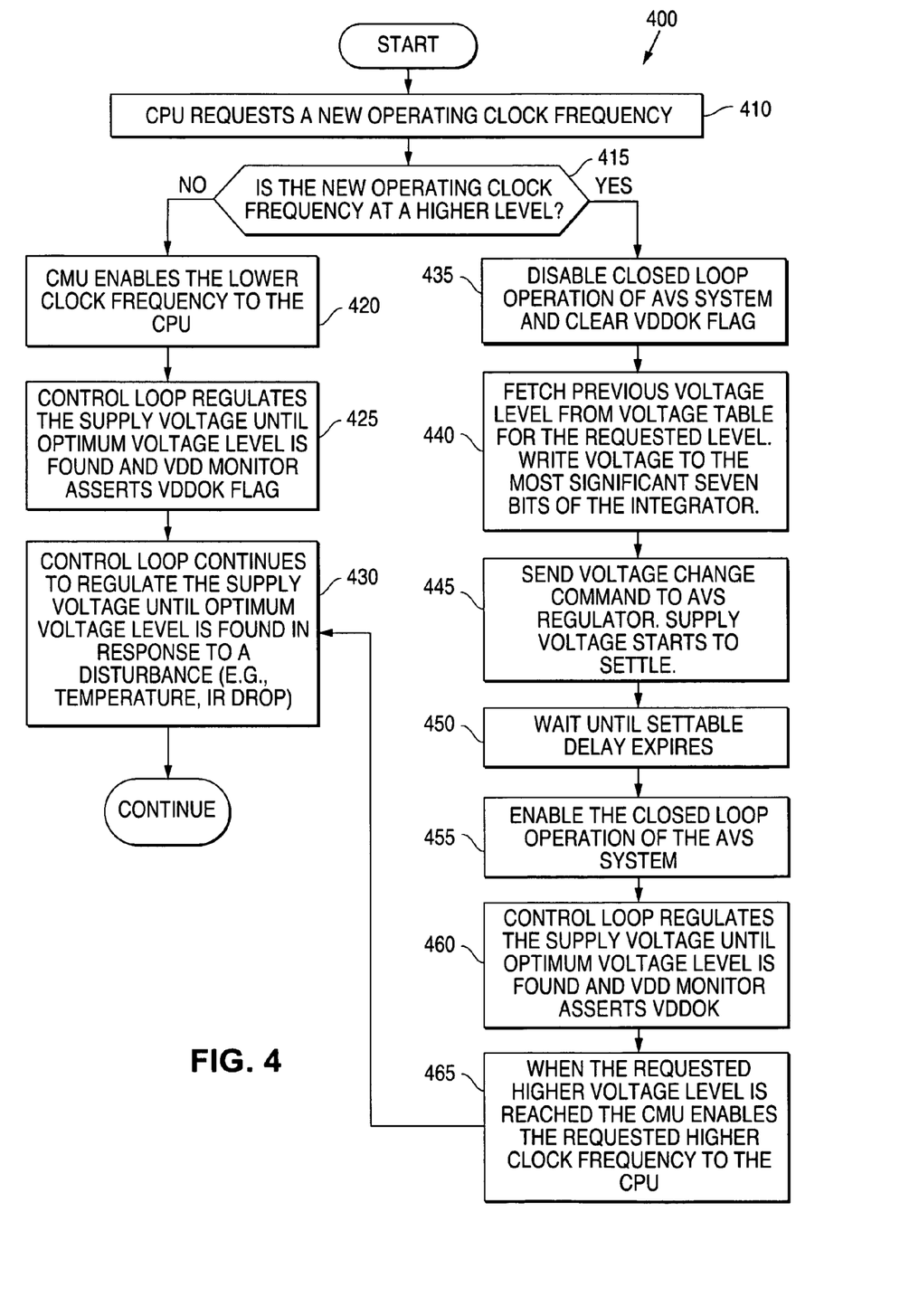
FIG. 4 is a flow chart illustrating an advantageous embodiment of a method of the present invention.

FIGS. 2 through 4, discussed below, and the various embodiments used to describe the principles of the present invention in this patent document are by way of illustration only and should not be construed in any way to limit the scope of the invention. Those skilled in the art will understand that the principles of the present invention may be implemented in any type of suitably arranged adaptive voltage scaling (AVS) system.

FIG. 2 illustrates a block diagram illustrating an advantageous embodiment of an adaptive voltage scaling (AVS) system 200 of the present invention. AVS System 200 comprises a Processor Subsystem in Variable Supply Voltage Domain 210, Hardware Performance Monitor (HPM) 215, Clock Management Unit (CMU) 220, Control Unit 225, Voltage Monitor 230 (also referred to as VDD Monitor 230), Error Amplifier 235, Integrator Subsystem 240, and Digital Interface 245. AVS System 200 also comprises an Adaptive Voltage Scaling (AVS) Regulator 250 (also referred to as AVS Power Supply). Integrator Subsystem 240 comprises Integrator 255 and Voltage Select Unit 280. The various elements of AVS System 200 are coupled together as shown in FIG. 2.

Clock Management Unit 220 receives a system clock signal (not shown in FIG. 2) from a system clock (also not shown in FIG. 2). Clock Management Unit 220 provides clock frequencies for the central processing unit (CPU) (not shown in FIG. 2). The clock frequencies that are provided to the CPU are represented by the designation "CPU Clock".

Clock Management Unit 220 also provides clock frequencies for the Hardware Performance Monitor (HPM) 215 that is located within the Processor Subsystem in Variable Supply Voltage Domain 210. The clock frequencies that are provided to the Hardware Performance Monitor (HPM) 215 are represented by the designation "HPM Clock".

Clock Management Unit 220 is also coupled to Control Unit 225. Clock Management Unit 220 contains handshaking logic circuitry that is capable of requesting and acknowledging a new operating frequency from the AVS system 200. Clock Management Unit 220 is capable of providing a target performance level to Control Unit 225. Clock Management Unit 220 is also capable of receiving the current performance level from Control Unit 225. Control Unit 225 provides control signals to make state transitions during operation of AVS system 200.

The Hardware Performance Monitor (HPM) 215 tracks gate delays in the current operational conditions. The Hardware Performance Monitor (HPM) 215 outputs a performance code that indicates the propagation delay of digital gate cells. The difference between a calibrated reference code in the Hardware Performance Monitor (HPM) 215 and the performance code is an error signal that is referred to as "Slack Time". The Slack Time error signal comprises a digital error signal in a two's complement number format. If the Slack Time is positive an increase in voltage is required. If the Slack Time is negative a decrease in voltage is required.

As shown in FIG. 2, the Hardware Performance Monitor (HPM) 215 outputs the Slack Time error signal to VDD Monitor 230 and to Error Amplifier 235. VDD Monitor 230 is also coupled to Control Unit 225. VDD Monitor 230 evaluates the suitability of supply voltage for the requested performance level. If the supply voltage is suitable, VDD Monitor 230 enables a VDDOK flag on a VDDOK signal line to Control Unit 225. VDD Monitor 230 is also capable of receiving a signal from Control Unit 225 indicating that the performance level has changed.

Error Amplifier 235 receives and amplifies the Slack Time error signal from Hardware Performance Monitor (HPM) 215. The amplified Slack Time error signal from Error Amplifier 235 is provided to Integrator 255 in Integrator Subsystem 240. An "Integrator Enable" signal line from Control Unit 225 is coupled to Integrator 255. When Integrator 255 is enabled Integrator 255 integrates the amplified Slack Time error at each clock cycle. In the advantageous embodiment illustrated in FIG. 2, the seven (7) top bits of Integrator 255 (i.e., the seven most significant bits (MSB)) represent the voltage level. Integrator 255 sends the bits that represent the voltage level to AVS Regulator 250 via Digital Interface 245. Digital Interface 245 creates a serial seven (7) bit voltage command and sends the command to the AVS Regulator 250.

AVS Regulator 250 provides an adjustable (i.e., variable) supply voltage to the CPU system and to the Hardware Performance Monitor (HPM) 215. In the advantageous embodiment illustrated in FIG. 2, AVS Regulator 250 provides the adjustable supply voltage signal to the Processor Subsystem in Variable Supply Voltage Domain 210. AVS Regulator 250 comprises circuitry (not shown) that generates and provides the adjustable supply voltage to the CPU system and to the Hardware Performance Monitor (HPM) 215.

As previously mentioned, Integrator Subsystem 240 comprises Integrator 255 and Voltage Select Unit 280. Voltage Select Unit 280 comprises Voltage Table 285 and Multiplexer 290. Voltage Table 285 contains a seven (7) bit register for each performance level. Each seven (7) bit value in Voltage Table 285 is a target voltage value that corresponds to a performance level. Each seven (7) bit target voltage value in Voltage Table 285 is the voltage value that was used by AVS System 200 when the corresponding performance level was last used.

Control signal lines from Control Unit 225 are coupled to Voltage Table 285. The control signal lines of Control Unit 225 comprise a "Register Address" signal line for addressing and accessing each one of the registers of Voltage Table 285. The control signal lines of Control Unit 225 also comprise a "Write" signal line for enabling a new seven (7) bit performance level value from Integrator 255 to be written into a performance level register of Voltage Table 285.

A control signal line 265 from Clock Management Unit (CMU) 220 is coupled to a select input of Multiplexer 290. Control signal line 265 provides a signal for a target performance level to Multiplexer 290 to select the register of Voltage Table 285 that has the requested target performance level. The output of Multiplexer 290 is a stored seven (7) bit voltage value. The seven (7) bits of the target voltage value are the top bits (i.e., the Most Significant Bits (MSB)). The remaining bits (i.e., other lower significant bits) are padded with "ones" in order to make the overall bit length equal to the bit length in Integrator 255.

The output of Multiplexer 290 is provided to a first input of Multiplexer 270 in Integrator 255. The amplified Slack Time signal from Error Amplifier 235 is provided to a first input of Summation Unit 260 in Integrator 255. N-Bits Register 275 is a register that holds the seven (7) top bits (i.e., the Most Significant Bits (MSB)) of the current voltage command. The output from N-Bits Register 275 is provided to a second input of Summation Unit 260. The output of Summation Unit 260 is provided to a second input of Multiplexer 270.

An "Initialize Voltage" control signal line from Control Unit 225 is coupled to a select input of Multiplexer 270. The "Initialize Voltage" control signal line provides a signal to Multiplexer 270 of Integrator 255 to initialize voltage selection. When the AVS System 200 requests a higher performance level, the target voltage value for the requested performance level is retrieved from Voltage Table 285. Control Unit 255 provides an "Initialize Voltage" signal to Multiplexer 270 causing Multiplexer 270 to direct the seven (7) bit target voltage value from Voltage Table 285 to Most Significant Bit (MSB) positions of N-Bit Register 275. As previously mentioned, the Lower Significant Bits (LSB) positions of N-Bit Register 275 are filled with "ones" so that all of the bits within N-Bit Register 275 are filled.

The seven (7) Most Significant Bits (MSBs) from N-Bit Register 275 are provided to Digital Interface 245 and are then provided to AVS Power Supply 250 as the new seven (7) bit AVS voltage command. A counter (not shown in FIG. 2) then counts until a settable delay time expires. After the settable delay time expires, Control Unit 255 disables the "Initialize Voltage" signal to Integrator 255. Integrator 255 is now updated with its own output (from N-Bits Register 275) plus the Slack Time error signal from Error Amplifier 235.

The closed loop operation of Integrator 255 continues until the Slack Time error signal is within acceptable limits as determined by VDD Monitor 230. When VDD Monitor 230 determines that the Slack Time error signal is within acceptable limits, then VDD Monitor 230 enables the VDDOK flag to Control Unit 255. Control Unit 255, in turn, updates the current performance level to Clock Management Unit (CMU) 220. The closed loop operation continues and Voltage Table 285 is continuously updated with the seven (7) Most Significant Bits (MSBs) from N-Bits Register 275.

When the AVS System 200 operates in a stable state (i.e., the performance level is not being changed), the AVS voltage level (i.e., the seven (7) Most Significant Bits of N-Bits Register 275 within Integrator 255) is stored continuously to Voltage Table 285 with an address that corresponds to the current performance level.

AVS system 200 operates in three different states depending on whether (1) the CPU has requested a higher performance level, or (2) the CPU has requested a lower performance level, or (3) the CPU has not requested a change in the performance level. When the CPU needs to operate at a different clock frequency, the CPU requests a new performance level.

A. The CPU Requests a Higher Performance Level.

When the CPU load is high the CPU may request a higher performance level. A higher clock frequency always requires a higher supply voltage. Therefore, the supply voltage must first be increased before the higher clock frequency can be enabled for the CPU. The supply voltage level is increased by first enabling the higher frequency to the Hardware Performance Monitor (HPM) 215. Then an evaluation is made to determine whether the voltage level is sufficient for the requested frequency. When the CPU requests a higher performance level, two parallel processes start to operate.

First, the closed loop control mode of AVS System 200 is disabled. Then a register value that represents a higher voltage level is fetched from Voltage Table 285 and is sent to AVS Regulator 250 via Digital Interface 245. Because the closed loop control mode is temporarily disabled, the slew rate is as fast as AVS Regulator 250 is able to achieve. After a short delay (designated "VDD Evaluation Delay"), further processing of the Slack Time error signal (i.e., integration) begins. This results in fine adjustments to the supply voltage level (i.e., the adjustable supply voltage level).

Second, voltage monitoring (in VDD Monitor 230) is activated shortly after the voltage transient. The settable delay (i.e., "VDD Evaluation Delay") determines the time when the VDD monitoring process begins. When the settable delay expires, the voltage monitor (VDD Monitor 230) starts to evaluate the suitability of the Slack Time error signal for the requested performance level. When the evaluation is successful, it is assumed that the supply voltage level (VDD) is stable. VDD Monitor 230 then enables the VDDOK flag on the VDDOK signal line to Control Unit 225.

B. The CPU Requests a Lower Performance Level.

When the CPU load is low the CPU may request a lower performance level. Because the currently available voltage level is always suitable for the lower clock frequency, the currently available voltage level is immediately enabled for the CPU. When the CPU requests a lower performance level, two parallel processes start to operate.

First, due to the lowered clock frequency on the "HPM Clock" signal line, the Hardware Performance Monitor (HPM) 215 outputs a highly negative Slack Time error signal. As the Slack Time error signal is further processed (by integration), the result is a rapid decrease in the supply voltage level. Note that the voltage is not fetched from Voltage Table 285 when the performance level is lowered.

Second, voltage monitoring (in VDD Monitor 230) is activated shortly after the voltage transient. The settable delay (i.e., "VDD Evaluation Delay") determines the time when the VDD monitoring process begins. When the settable delay expires, the voltage monitor (VDD Monitor 230) starts to evaluate the suitability of the Slack Time error signal for the requested performance level. When the evaluation is successful, it is assumed that the supply voltage level (VDD) is stable. VDD Monitor 230 then enables the VDDOK flag on the VDDOK signal line to Control Unit 225.

C. The CPU does not Request Different Performance Level

As previously mentioned, when the AVS System 200 operates in a stable state (i.e., the performance level is not being changed), the AVS voltage level (i.e., the seven (7) Most Significant Bits (MSBs) of N-Bits Register 275 within Integrator 255) is stored continuously to Voltage Table 285 with an address that corresponds to the current performance level.

FIG. 3 is a timing diagram illustrating how a process of adaptive voltage scaling (AVS) in accordance with the principles of the present invention rapidly increases a rising slew rate of an AVS voltage. At first the requested performance level signal is "low" (designated by numeral "1") and the current performance level signal is "low (also designated by numeral "1"). Also at first the CPU clock frequency is "Low" and the AVS voltage is at low voltage level. Also at first the VDDOK flag is enabled and the AVS mode is enabled.

The CPU then requests a higher performance level. This causes the requested performance level signal to go "high" (designated by numeral "4"). The VDDOK flag is disabled and the AVS mode is disabled. The AVS voltage quickly increases to the requested higher level of voltage.

After the AVS voltage (VDD) reaches the requested higher level of voltage, the AVS mode is then enabled. After the optimum voltage level is found the VDD monitor 230 enables the VDDOK flag. Then the CPU clock frequency signal goes from a "Low" level to a "High" level and the current performance level signal goes from a "low" level (designated by numeral "1") to a "high" level (designated by numeral "4"). In this manner AVS System 200 rapidly increases the rising slew rate of the AVS voltage. The AVS voltage quickly reaches the new requested higher voltage level.

The timing diagrams in FIG. 3 also illustrate the changes that occur when the AVS voltage is "high" and the CPU requests a lower performance level. The requested performance level signal for the "high" level (designated by numeral "4") is disabled and the requested performance level signal for the "low" level (designated by numeral "1") is enabled. The current performance level signal for the "high" level of performance (designated by numeral "4") is disabled and the current performance level signal for the "low" level of performance (designated by numeral "1") is enabled. The CPU clock frequency for the "High" level is disabled and the CPU clock frequency for the "Low" level is enabled.

The VDDOK flag is disabled. The AVS mode remains enabled. The AVS voltage begins to decrease to the requested lower level of voltage. After the AVS voltage (VDD) reaches the requested lower level of voltage, the VDDOK flag is enabled. The AVS voltage level slowly stabilizes at the requested lower level of voltage.

FIG. 4 is a flow chart 400 illustrating an advantageous embodiment of a method of the present invention. In the first step the CPU requests a new operating clock frequency (step 410). A decision is then made to determine whether the new operating clock frequency is at a higher level (decision step 415). If the requested new operating clock frequency is not at a higher level, the Clock Management Unit (CMU) 220 enables the lower clock frequency to the CPU (step 420). Then the control loop regulates the supply voltage until the optimum voltage level is found and the VDD Monitor 230 asserts the VDDOK flag (step 425).

The control loop of the AVS system 200 continues to regulate the supply voltage until the optimum voltage level is found in response to a disturbance (e.g., temperature, IR voltage drop) (step 430). Then the method steps continue.

Returning to step 415, if the requested new operating clock frequency is at a higher level, then the AVS System 200 disables its closed loop operation and clears the VDDOK flag (step 435). The AVS System 200 then fetches the previous voltage level from the Voltage Table 485 for the requested level. The voltage value is written to the seven Most Significant Bits (MSB) of the Integrator 255. The remaining lower order bits are each set to "one" (step 440). Then the voltage change command is sent to AVS Regulator 250. The value of the supply voltage starts to settle (step 445). Then AVS System 200 waits for the settable delay period to expire (step 450).

Then AVS System 200 enables its closed loop operation. The VDD Monitor 230 begins to evaluate the supply voltage for the requested frequency (step 455). During this time the supply voltage goes toward the requested voltage level.

The control loop of AVS System 200 regulates the supply voltage until the optimum voltage level is found and the VDD Monitor 230 asserts the VDDOK flag (step 460). When the requested higher voltage level is reached, the Clock Management Unit (CMU) 220 enables the requested higher clock frequency to the CPU (step 466). Then control passes to step 430. The control loop of the AVS system 200 continues to regulate the supply voltage until the optimum voltage level is found in response to a disturbance (e.g., temperature, IR voltage drop) (step 430). Then the method steps continue.

There are two components in the AVS System 200 that affect the overall slew rate of the AVS System 200. The first component is the AVS Power Supply 250. The second component is the Advanced Power Controller circuitry (especially the loop filter circuitry that consists of Error Amplifier 235 and Integrator 255). The AVS Power Supply 250 operates as part of the overall AVS System 200. Therefore, the overall slew rate of the AVS System 200 is always less than (or at most equal to) the slew rate of the AVS Power Supply 250.

During closed loop operation the overall slew rate of AVS System 200 is further reduced by the operation of the loop filter. The present invention enables the AVS System 200 to achieve the full slew rate that is available from AVS Power Supply 250 by temporarily disconnecting the loop filter when performance levels are being increased. During the time that the loop filter is disconnected the AVS System 200 obtains the full slew rate of the AVS Power Supply 250.

Although the present invention has been described with several embodiments, various changes and modifications may be suggested to one skilled in the art. It is intended that the present invention encompass such changes and modifications as fall within the scope of the appended claims.

What is claimed is:

1. An apparatus for providing closed loop feedback control in an adaptive voltage scaling system, the apparatus comprising:
   circuitry configured to increase a rising slew rate of an adjustable supply voltage of the adaptive voltage scaling system;
   wherein the circuitry is configured to increase the rising slew rate of the adjustable supply voltage when a closed loop control mode of the adaptive voltage scaling system is disabled, wait for a delay period to expire, enable the closed loop control mode of the adaptive voltage scaling system in response to the delay period expiring, and evaluate a suitability of the adjustable supply voltage.

2. The apparatus as set forth in claim 1, wherein the circuitry comprises an integrator subsystem that comprises an integrator unit and a voltage select unit.

3. The apparatus as set forth in claim 2, wherein the voltage select unit comprises:
   a voltage table memory unit containing a plurality of voltage values, wherein each voltage value is associated with a performance level of the adaptive voltage scaling system; and
   a multiplexer associated with the voltage table memory unit, wherein the multiplexer is configured to receive a signal that represents a requested performance level, select one of the voltage values that is associated with the requested performance level, and provide the selected voltage value to the integrator unit.

4. The apparatus as set forth in claim 3, wherein each of the voltage values in the voltage table memory unit comprises seven most significant bits of a data field.

5. An apparatus for providing closed loop feedback control in an adaptive voltage scaling system, the apparatus comprising:
   circuitry configured to increase a rising slew rate of an adjustable supply voltage of the adaptive voltage scaling system when a closed loop control mode of the adaptive voltage scaling system is disabled, wherein the circuitry comprises an integrator subsystem that comprises an integrator unit and a voltage select unit;
   wherein the voltage select unit comprises:
      a voltage table memory unit containing a plurality of voltage values, wherein each voltage value is associated with a performance level of the adaptive voltage scaling system; and
      a first multiplexer associated with the voltage table memory unit, wherein the first multiplexer is configured to receive a signal that represents a requested performance level, select one of the voltage values that is associated with the requested performance level, and provide the selected voltage value to the integrator unit.

6. The apparatus of claim 5, wherein the circuitry is configured to increase the rising slew rate of the adjustable supply voltage when a closed loop control mode of the adaptive voltage scaling system is disabled.

7. The apparatus of claim 5, wherein the integrator unit comprises:
   a multi-bit register configured to hold a multi-bit voltage value, the multi-bit register also configured to provide the multi-bit voltage value to the voltage table memory unit and to an adaptive voltage scaling regulator of the adaptive voltage scaling system.

8. The apparatus as set forth in claim 7, wherein the integrator unit further comprises:
- a summation unit having a first input coupled to an error amplifier of the adaptive voltage scaling system and a second input coupled to an output of the multi-bit register; and
- a second multiplexer having a first input coupled to an output of the summation unit, a second input coupled to an output of the first multiplexer, an output coupled to an input of the multi-bit register, and a select input coupled to an initialize voltage signal line.

9. A method for changing a level of an adjustable supply voltage in an adaptive voltage scaling system, the method comprising the steps of:
- receiving a request for a new operating clock frequency;
- determining that the requested new operating clock frequency is a higher frequency than a current operating clock frequency;
- disabling a closed loop control mode of the adaptive voltage scaling system; selecting a value of voltage that is associated with the requested new operating clock frequency;
- providing a voltage change command associated with the selected value of voltage to an adaptive voltage scaling regulator of the adaptive voltage scaling system;
- waiting for a delay period to expire;
- enabling the closed loop control mode of the adaptive voltage scaling system in response to the delay period expiring; and
- evaluating a suitability of the adjustable supply voltage for the requested new operating clock frequency.

10. The method as set forth in claim 9, further comprising the step of:
- operating the adaptive voltage scaling system at a maximum slew rate that can be achieved by the adaptive voltage scaling regulator.

11. The method as set forth in claim 9, wherein the voltage change command comprises seven most significant bits of a data field.

12. The method as set forth in claim 9, further wherein waiting for the delay period to expire comprises waiting for a constant delay period to expire.

13. The method as set forth in claim 9, further comprising the steps of:
- regulating the adjustable supply voltage until an optimum level is obtained for the requested new operating clock frequency; and
- enabling the new operating clock frequency for a component that provided the request for the new operating clock frequency.

14. A method for increasing a rising slew rate of an adjustable supply voltage of an adaptive voltage scaling regulator in an adaptive voltage scaling system, the method comprising the steps of:
- disabling a closed loop control mode of the adaptive voltage scaling system;
- providing a voltage change command to the adaptive voltage scaling regulator; and
- operating the adaptive voltage scaling system at a maximum slew rate that can be achieved by the adaptive voltage scaling regulator.

15. The method as set forth in claim 14, further comprising the step of:
- obtaining a value of voltage that is provided to the adaptive voltage scaling regulator as the voltage change command.

16. The method as set forth in claim 15, wherein the value of voltage that is provided to the adaptive voltage scaling regulator is associated with a performance level of the adaptive voltage scaling system.

17. The method as set forth in claim 15, wherein the value of voltage that is provided to the adaptive voltage scaling regulator comprises seven most significant bits of a data field.

18. The method as set forth in claim 14, further comprising the steps of:
- waiting for a delay period to expire;
- enabling the closed loop control mode of the adaptive voltage scaling system; and
- evaluating a suitability of the adjustable supply voltage for a requested new operating clock frequency.

19. The method as set forth in claim 18, further comprising the steps of:
- regulating the adjustable supply voltage until an optimum level of voltage is obtained for the requested new operating clock frequency; and
- enabling the new operating clock frequency for a component that provided a request for the new operating clock frequency.

20. The method as set forth in claim 19, further comprising the steps of:
- determining that gate delay of the adaptive voltage scaling system is increasing due to a disturbance; and
- regulating the adjustable supply voltage until an optimum level is obtained in response to the disturbance.

21. The method as set forth in claim 20, wherein the disturbance is at least one of: a voltage drop, a temperature change, and a ripple voltage.

22. A method for increasing a rising slew rate of an adjustable supply voltage of an adaptive voltage scaling regulator in an adaptive voltage scaling system, the method comprising the steps of:
- requesting an increase in a performance level of the adaptive voltage scaling system;
- disabling a closed loop control mode of the adaptive voltage scaling system;
- providing a voltage change command to the adaptive voltage scaling regulator;
- operating the adaptive voltage scaling system at a maximum slew rate that can be achieved by the adaptive voltage scaling regulator; and
- after the adjustable supply voltage reaches a specified value of voltage, enabling the closed loop control mode of the adaptive voltage scaling system.

23. A system comprising:
- an adaptive voltage scaling system comprising an adjustable supply voltage and an adaptive voltage scaling regulator; and
- an apparatus configured to provide closed loop feedback control for the adaptive voltage scaling system, the apparatus comprising circuitry configured to increase a rising slew rate of the adjustable supply voltage when a closed loop control mode of the adaptive voltage scaling system is disabled, wherein the circuitry is further configured to provide a voltage change command to the adaptive voltage scaling regulator;
- wherein the adaptive voltage scaling system is configured to operate at a maximum slew rate that can be achieved by the adaptive voltage scaling regulator.

* * * * *